United States Patent [19]

Berryhill et al.

[11] Patent Number: 4,803,668

[45] Date of Patent: Feb. 7, 1989

[54] METHOD OF 3-D SEISMIC IMAGING FOR STRUCTURES WITH APPROXIMATE CIRCULAR SYMMETRY

[75] Inventors: John R. Berryhill; John C. Wride, both of Houston, Tex.

[73] Assignee: Exxon Production Research Company, Houston, Tex.

[21] Appl. No.: 199,942

[22] Filed: May 27, 1988

[51] Int. Cl.$^4$ ............................ G01V 1/36; G01V 1/38
[52] U.S. Cl. ........................................ 367/72; 367/56; 367/58; 364/421
[58] Field of Search ................ 367/21, 53, 56, 58, 367/72; 364/421; 33/303

[56] References Cited

U.S. PATENT DOCUMENTS

| H482 | 6/1988 | Berryhill ........................... 364/421 |
|---|---|---|
| 2,759,551 | 8/1956 | Carlisle et al. |
| 3,181,643 | 5/1965 | Ehlert et al. |
| 3,400,783 | 9/1968 | Lee et al. ........................... 367/58 |
| 3,613,071 | 10/1971 | Quay |
| 3,934,220 | 1/1976 | Davis ................................... 367/21 |
| 4,146,870 | 3/1979 | Ruehle |
| 4,207,619 | 6/1980 | Klaveness |
| 4,213,194 | 7/1980 | Spurloch et al. .................... 367/56 |
| 4,476,552 | 10/1984 | Water et al. ........................ 367/58 |
| 4,486,863 | 12/1984 | French |
| 4,561,073 | 12/1985 | Brands Aeter et al. |
| 4,567,582 | 1/1986 | Kuhn |
| 4,571,710 | 2/1986 | Neidell, et al. |
| 4,633,448 | 12/1986 | Koeijmans |
| 4,677,598 | 6/1987 | Johnson |
| 4,682,307 | 7/1987 | Newman |

FOREIGN PATENT DOCUMENTS 1183930 10/1985 U.S.S.R.
2055202 2/1981 United Kingdom.

OTHER PUBLICATIONS

OTC Publication, Blake, et al, 1982 "Three Dimensional Siesmic Data Reveals the Finer Details of a Pier Cement Salt Dome".
Ikeuchi, K.; "Determining a Depth Map ... Matching", Sep. Comput., Jpn., vol. 17, #'s, pp. 92–103, 5/86; abst.
Ivenov et al; "3–D Seismic Survey in ... Terrain"; 11th World Petrol Congr., 8/28/83, PD 4(5), 8 pp.; abst.

Primary Examiner—Nelson Moskowitz

[57] ABSTRACT

A 3-D radial seismic survey method is described suitable for accurately defining by migration processing an area having a dome-like subsurface structure. Radial survey lines are plotted with polar symmetry with respect to a center position at the center of the dome, such lines traversing the steep dip in all directions at approximate right angles. Hence, the developed data is efficiently acquired data useful for defining the structure. Bisecting survey lines may be provided as the original lines diverge to satisfy sampling requirements for migration. Data is acquired and sorted into bins that are annulus sectors and which are maintained sufficiently uniform in size to be within a maximum-to-minimum ratio of 2-to-1. Seismic source and receiver lines may be coincident or angularly offset.

9 Claims, 1 Drawing Sheet

FIG. 1
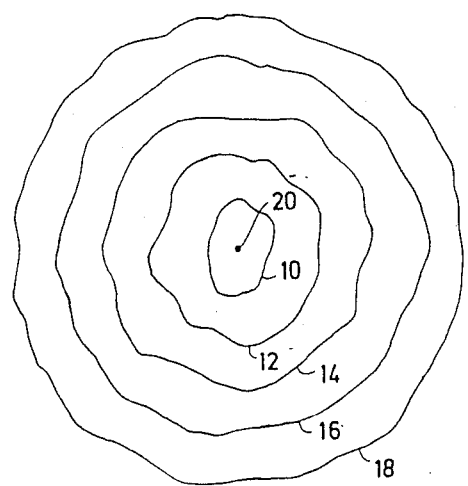
FIG. 2
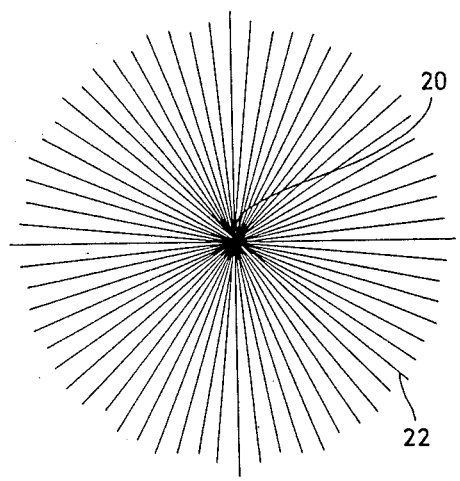
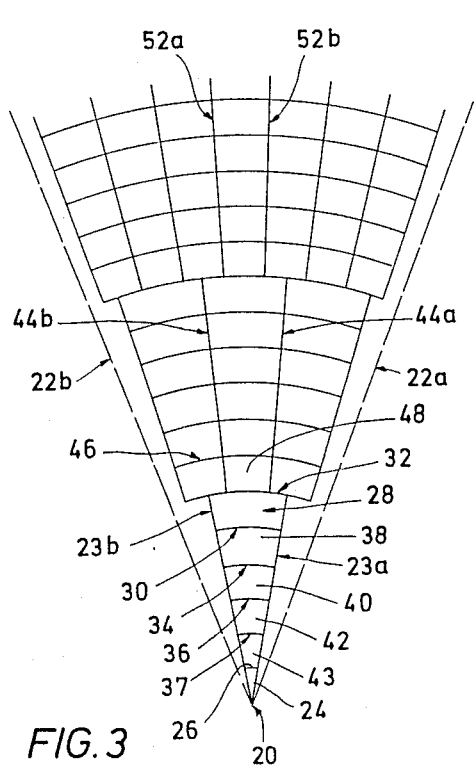
FIG. 3
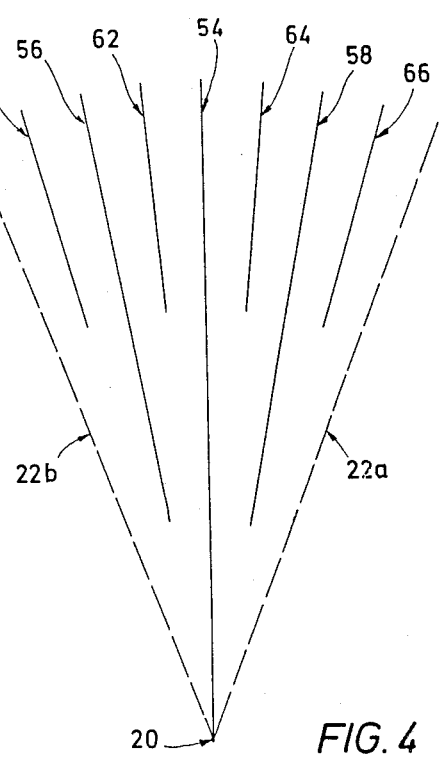
FIG. 4

METHOD OF 3-D SEISMIC IMAGING FOR STRUCTURES WITH APPROXIMATE CIRCULAR SYMMETRY

BACKGROUND OF THE INVENTION

1. Field of the Invention

This invention pertains to the acquisition of seismic imaging reflection data for input to a 3-D migration data process particularly suited for subsurface stratigraphic structures having relatively steep dip with approximate circular symmetry.

2. Description of the Prior Art

Diapirs and domes, which dip steeply in all directions from an approximate central position or peak, are structures commonly of interest in seismic prospecting. Experience has taught that 2-D common midpoint reflection data of optimum data quality can be achieved by orienting profiles radially, i.e., in the direction of maximum dip. The surface spatial sampling required to properly image the earth's subsurface through the process of seismic migration is governed by the severity of dip and the velocity of propagation through the earth. By experience, it has been learned that wide apertures and tight sampling intervals are necessary to resolve steeply dipping seismic targets. The acquisition and processing of such information is economically efficient to obtain for 2-D surveys.

Although the line orientation described above improves 2-D data quality for steeply dipping events, these structures are commonly accompanied by radial faulting that corrupts the data. Such faults are poorly resolved by such technique. Hence, further improvements in data quality are typically pursued by conducting a 3-D survey. With conventional 3-D survey methodology, common midpoint data is acquired in parallel lines throughout the area of interest. A rectilinear sampling, or so-called "binning", scheme is used to sort and stack the data for input to a 3-D migration process. Small, usually square "bins" are required to provide adequate sampling since nothing is incorporated in the procedure allowing for a dominant dip direction. This is so, even though through prior or preliminary data gathering it is known that there are dominant dips in multiple directions from a central position.

Two primary disadvantages are evident with the parallel method just described. First, the majority of the common midpoint reflection data that is collected contains the reflected energy from the targets of interest on the flanks of the structure as sideswipe. Such acquired data quality is degraded when compared with data acquired in the direction of dominant dip. Further, velocity analysis is complicated for such acquired data. The second primary disadvantage to the parallel method is the very high cost involved as a result of the dense surface coverage required to result in valid data for migration processing. In order to satisfy proper sampling requirements at all times, much of the surface area must be oversampled because sampling is not related to the structure of interest to be imaged.

Therefore, it is a feature of the present invention to provide an improved method of acquiring seismic data related to a seismic subsurface known to be approximately circular in character by acquiring data in radial patterns from the center of such subsurface, the data acquired being efficiently sampled for the steep dip structure with respect to the center and not resulting in oversampled data not related to the dip structure.

It is another feature of the present invention to provide an improved method of acquiring seismic data for migration processing by acquiring polar symmetrical data with respect to a center position of an area that dips in all directions therefrom, the data being acquired and sorted in annular sectors of approximately the same size regardless of how far an individual sector is away from the center.

SUMMARY OF THE INVENTION

The method for acquiring seismic imaging reflection data for input to a 3-D migration process in accordance with the present invention begins with locating the central position of the survey from previously acquired preliminary knowledge. Prior to initiating the survey method, it is assumed that it is generally known that the dip will be universally away from such central position in all directions. Radial lines are then plotted through the central position over a complete circle to divide the circle into uniform sectors. A minimum and a maximum size "bin unit" is established for the acquisition of common midpoint reflection data. The radial dimension of this unit is constant and is determined by the sampling requirements for imaging the steeply dipping structure. The circumferential dimension varies, and is determined by sampling requirements for less steeply dipping events away from the flanks of the structure. However, a ratio of 2-to-1 maximum to minimum is the preferred relative limits of the bin unit size. These bin units are annular sectors defined by radial lines from the center and sequentially larger concentric circles, all with the center position as their center. In order that the circumferential dimension of the respective bin units are maintained within the defined maximum and minimum limits, new radial lines can be started and progress outwardly bisecting the arcs of the maximum size bin units. Some of the survey lines are coincident for both sources and receivers; however, multiple source lines can be recorded by a single receiver line or, alternatively, multiple receiver lines can record a single source line, thereby permitting some acquisition of data that is angularly offset.

BRIEF DESCRIPTION OF THE DRAWINGS

So that the manner in which the above-recited features, advantages and objects of the invention, as well as others which will become apparent, are attained and can be understood in detail, more particularly description of the invention briefly summarized above may be had by reference to the embodiment thereof that is illustrated in the drawings, which drawings form a part of the specification. It is to be noted, however, that the appended drawings illustrate only a preferred embodiment of the invention and are, therefore, not to be considered limiting of its scope for the invention may admit to other equally effective embodiments.

In the drawings

FIG. 1 is a top stratigraphic representation of a dome formation having a central position higher in elevation than the surrounding structure and having a steep dip in all directions therefrom as represented by the contour lines.

FIG. 2 is a plotting of the receiver survey lines for the acquisition of seismic data in accordance with a preferred embodiment of the present invention.

FIG. 3 is a representation of the 3-D binning units as annular sectors in accordance with the present invention.

FIG. 4 is a representation of a preferred embodiment of the present invention illustrating source and receiver lines both coincident and angularly offset.

DESCRIPTION OF THE PREFERRED EMBODIMENT

Now referring to the drawings and first to FIG. 1, the contour lines 10, 12, 14, 16 and 18 are shown for a domed stratigraphic seismic structure, each contour line being 2000 feet (610 meters) deeper than the next with contour line 10 defining a depth that is 2000 feet (610 meters) below the earth's surface. Hence, it will be seen that a center position 20 is located in the approximate center of a domed or peaked subsurface and therefrom in all directions the sides of the subsurface structure define a rather steep dip. Such a structure is typical of a salt dome and is generally interesting for seismic survey analysis. Although prior to conducting a detailed 3-D survey, the area is not well defined, it is assumed for the purposes of employing the method herein described that the general shape of the structure is known and that center position 20 can be plotted.

In order for the survey lines to be generally drawn orthogonal or at approximate right angles to the dip contours, the proposed receiver lines for the survey are plotted with polar symmetry extending from center position 20. For purposes of example, sixty-four receiver lines 22 are drawn with respect to center position 20 as shown in FIG. 2. In addition, these sixty-four lines are also representation of some of the source lines for the survey. As will be explained, additional source lines will be required in most cases.

It will be seen that if the desired area of coverage is large, for example on the order of five miles (8 km) from the center to the perimeter, lines 22 diverge quite aways apart at the outer reaches of the area. It is expected that this will occur, so only near the center of the survey area will the lines be sufficiently close together to provide adequately dense data for migration processing.

The actual number of the receiver lines and the spacing of the receivers will be determined by the actual steepness of the dip encountered in accordance with well-known principles. However, a spacing of 50 meters for the receivers is typical.

Common midpoint reflection data is commonly acquired and sorted into "bins" or "binning units" of approximately equal size over the area for migration processing. The binning units of the preferred embodiment are shown in FIG. 3, wherein two survey lines 22a and 22b determine the radial sector boundaries of the portion shown. Each binning unit is represented by an annular sector. The center line of the binning units nearest to center position 20 have their centers on a line bisecting source and receiver lines, represented by lines 22a and 22b in the drawing. The smallest or minimum unit size is bin 24, defined by center position 20, radial portions of lines 23a and 23b and an arc 26 of a small circle with position 20 as its center. The maximum bin unit size is chosen for valid migration processing, and is represented in the diagram as bin 28. The radial sides of bin 28 are defined as respective radial portions of radial lines 23a and 23b that are equal in length to the radial sides of bin 24. The arcuate sides of bin 28 are defined by arcs of two adjacent circles 30 and 32. Arcs of circles 34, 36, and 37 provide the additional boundaries for defining intermediate bins 38, 40, 42, and 43 between bins 24 and 28 with radial portions of lines 23a and 23b equal in length to the radial dimensions of the previously described bins.

It will be apparent that by merely drawing additional concentric arcs at radially further equal distances, the bin sizes begin to become larger than for the maximum size that has been established. Hence, at arc 32 radial lines 44a and 44b are drawn at an angular separation half that between lines 23a and 23b, so that mid-point between them is centered between lines 22a and 22b. Thus, between arc 32 and arc 46, the next arc distance at the radial distance selected for a bin size, bin 48 is defined and is of a size slightly larger than half of bin 28. The scheme is continued until it is necessary to plot additional bisecting lines 52a and 52b. In mathematical summary, the number of bins in one revolution is two raised to a whole exponent number, in this case by a power of two.

Although only one partial sector has been described in FIG. 3, the same scheme as that described for that sector will be continued for the entire area of the survey between the remaining receiver lines 22 until the entire area is partitioned into binning units.

The acquisition of sufficient common midpoint data to adequately fill the bins described in FIG. 3 requires additional survey lines to the lines drawn in FIG. 2. These are illustrated in FIG. 4. Shot lines and receiver lines can be identical for all of lines 22. However, as additional radial lines 54 and then 56 and 58 and so forth are established, it is not practical to use these survey lines for both receivers and sources due to operational inefficiency. Thus, lines 54, 56 and 58 define lines for sourcing only. FIG. 4 is not drawn to scale but is expanded for purposes of illustration.

Receiver lines 22a and 22b are lines for laying out receivers. Such receivers in a marine setting can be cable connected or connected by radio communication links and can be laid out for the complete lines shown or for a portion thereof depending on the limited number of receivers available. The source lines including lines 22a and 22b, intermediate line 54, as well as additional intermediate bisecting lines 56, 58, 60, 62, 64 and 66 define lines for the source boat to traverse while appropriately initiating source events for the survey, which provide data for reception by the receivers located on receiver lines 22a and 22b. Hence, some of the data that is generated is coincident data (where the source events and the receivers are on the same line) and some of it is slightly angularly offset (where the source events and the receivers are not on the same lines). Subject to geologic and geophysical considerations, a limit exists as to how many source-only lines can be developed between receiver lines, but for 8000 meters or so receiver lines 22a and 22b separated by an angle of 5.625 degrees (for 64 receiver lines as shown in FIG. 2), seven intermediate source lines as shown in FIG. 4 is acceptable. The receivers at the end of such lines are approximately 785 meters apart in that case.

In actual practice, the source lines for each of receiver lines 22, and the bisecting source lines, would start at center 20 and extend outward. Additional bisecting source lines would start at 2000 meters and 4000 meters, as shown.

It is estimated that the number of bin units necessary for covering the same subsurface area using the radial 3-D survey method described herein is approximately half that needed for a conventional 3-D survey using parallel lines close enough to result in an adequate amount of data for equivalent migration processing. Since the shot points involved can be expected to be in the several hundred thousand range, the savings in acquisition and processing costs are significant.

Although the survey has been described suggesting the use of a boat source, and thus a marine setting, the technique or method described is equally applicable to a land survey.

While a preferred embodiment of the invention has been shown and described, and modifications or alternatives have been discussed, it will be understood that the invention is not limited thereto since modifications can be made and will become apparent to those skilled in the art.

What is claimed is:

1. Method of acquiring seismic imaging reflection data for input to a 3-D migration process, comprising
    locating a central position that is universally central to the dominant dip directions from a peaked stratigraphic subsurface,
    orienting radial survey lines for the taking of common midpoint reflection data with polar symmetry with respect to said central position, and
    establishing annular sector binning units for the acquired and sorted survey data within a ratio of substantially 2-to-1 for the largest bin to the smallest bin by increasing the number of bins within a revolution as the radial distance from the center is increased,
wherein said largest bin size provides data density for valid migration processing.

2. Method of acquiring seismic imaging reflection data in accordance with claim 1, wherein said radial survey lines are coincident for the source lines and the receiver lines.

3. Method of acquiring seismic imaging reflection data in accordance with claim 1, wherein intermediate radial survey lines bisecting the survey lines radially inward therefrom are initiated at some radial distance from said central position for the purpose of achieving sufficient common midpoint coverage within all bins.

4. Method of acquiring seismic imaging reflection data in accordance with claim 1, wherein said radial survey lines include coincident source lines and receiver lines and angularly offset source lines and receiver lines.

5. Method of acquiring seismic imaging reflection data in accordance with claim 1, wherein the number of bins in one revolution is two raised to a whole exponent.

6. Method of acquiring seismic imaging reflection data in accordance with claim 5, wherein said whole exponent number is two.

7. Method of acquiring seismic imaging reflection data in accordance with claim 5, wherein there are a plurality of angularly offset source survey lines intermediate a pair of adjacent receiver survey lines.

8. Method of acquiring seismic imaging reflector data in accordance with claim 1, wherein said annular sector binning units are defined by common radial dimensions and concentric circles with said central position being the common center therefor.

9. Method of acquiring seismic imaging reflector data in accordance with claim 1, wherein less than a full revolution of data is acquired of sufficient quantity to appropriately apply a 3-D migration process.

* * * * *